Figure 1:
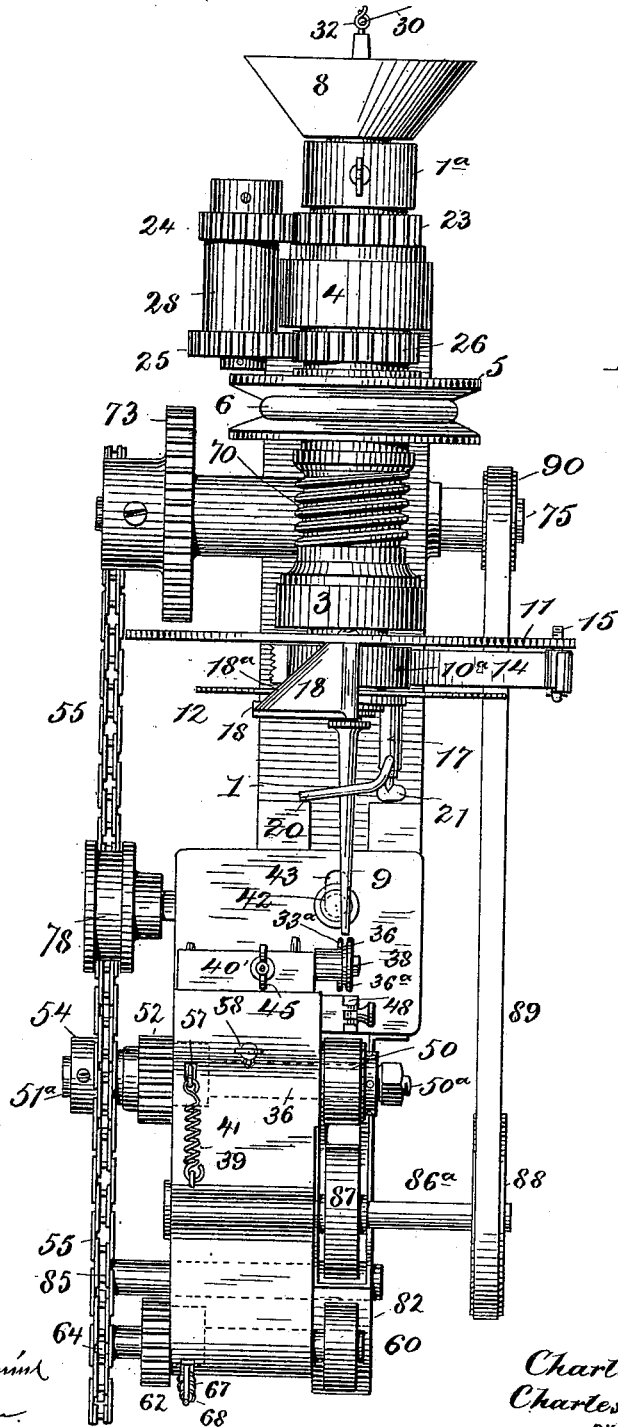

No. 634,195. Patented Oct. 3, 1899.
C. B. BIDWELL & C. L. CURTIS.
COMBUSTIBLE STEM MAKING MACHINE.
(Application filed Jan. 27, 1898.)

(No Model.) 6 Sheets—Sheet 1.

WITNESS
INVENTORS
Charles B. Bidwell
and
Charles L. Curtis.
BY
ATTORNEY

No. 634,195. Patented Oct. 3, 1899.
C. B. BIDWELL & C. L. CURTIS.
COMBUSTIBLE STEM MAKING MACHINE.
(Application filed Jan. 27, 1898.)

(No Model.) 6 Sheets—Sheet 2.

WITNESS
INVENTORS
Charles B. Bidwell
and
Charles L. Curtis
BY
ATTORNEY

No. 634,195. Patented Oct. 3, 1899.
C. B. BIDWELL & C. L. CURTIS.
COMBUSTIBLE STEM MAKING MACHINE.
(Application filed Jan. 27, 1898.)

(No Model.) 6 Sheets—Sheet 3.

WITNESS
G. W. Benjamin
War Jacobs

INVENTORS
Charles B. Bidwell
and
Charles L. Curtis,
BY
Joseph L. Levy
ATTORNEY

THE NORRIS PETERS CO., PHOTO-LITHO., WASHINGTON, D. C.

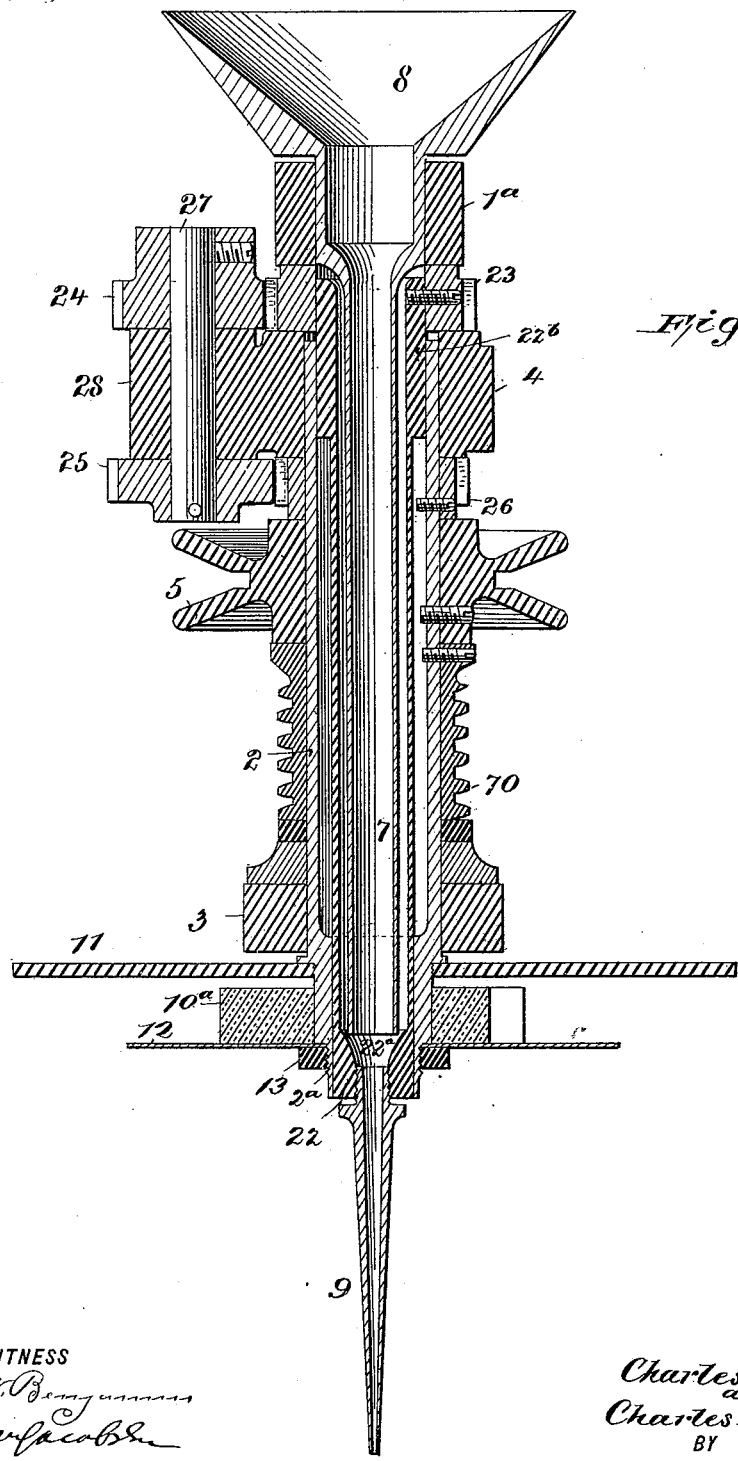

No. 634,195. Patented Oct. 3, 1899.
C. B. BIDWELL & C. L. CURTIS.
COMBUSTIBLE STEM MAKING MACHINE.
(Application filed Jan. 27, 1898.)
(No Model.) 6 Sheets—Sheet 5.
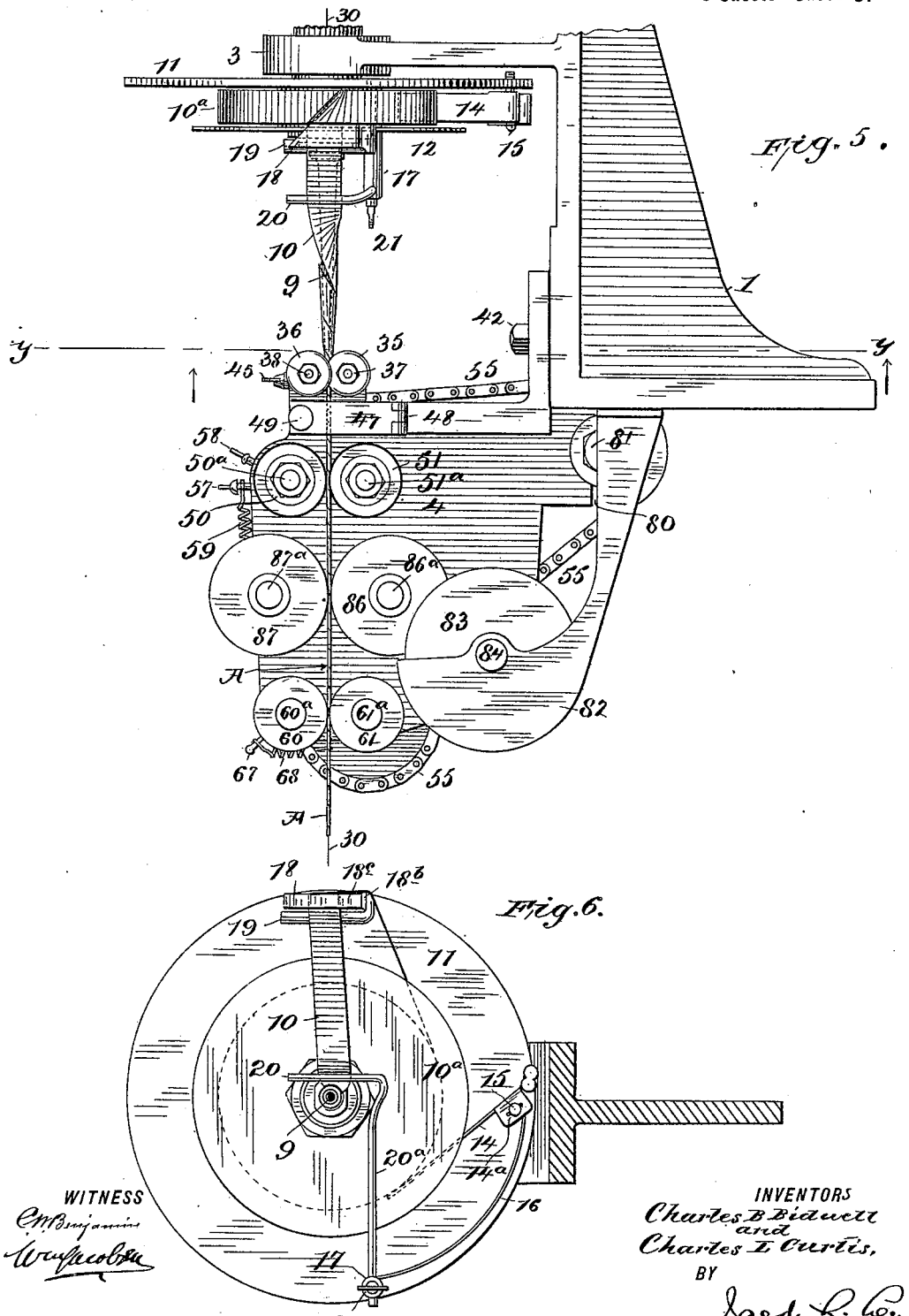

No. 634,195. Patented Oct. 3, 1899.
C. B. BIDWELL & C. L. CURTIS.
COMBUSTIBLE STEM MAKING MACHINE.
(Application filed Jan. 27, 1898.)
(No Model.) 6 Sheets—Sheet 6.
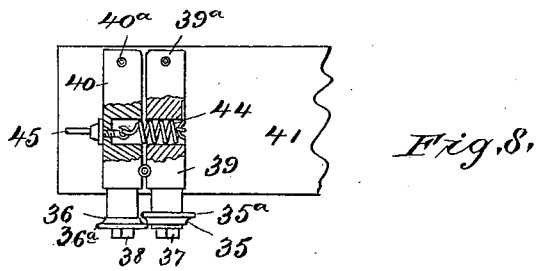
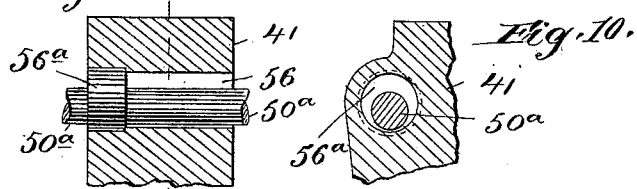
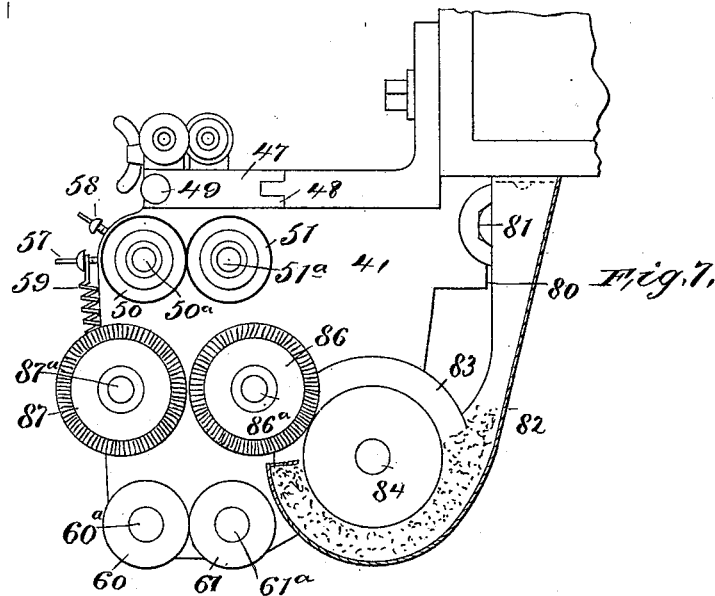
WITNESS
INVENTORS
Charles B. Bidwell
and
Charles L. Curtis.
BY
Joseph L. Levy
ATTORNEY
THE NORRIS PETERS CO., PHOTO-LITHO., WASHINGTON, D. C.

UNITED STATES PATENT OFFICE.

CHARLES B. BIDWELL AND CHARLES L. CURTIS, OF NEW YORK, N. Y., ASSIGNORS, BY MESNE ASSIGNMENTS, TO THE NORDLINGER-CHARLTON FIREWORKS COMPANY, OF SAME PLACE.

COMBUSTIBLE-STEM-MAKING MACHINE.

SPECIFICATION forming part of Letters Patent No. 634,195, dated October 3, 1899.

Application filed January 27, 1898. Serial No. 668,112. (No model.)

*To all whom it may concern:*

Be it known that we, CHARLES B. BIDWELL, residing at New York, (Metropolitan,) Queens county, and CHARLES L. CURTIS, residing at New York, (Brooklyn,) Kings county, State of New York, citizens of the United States, have invented certain new and useful Improvements in Combustible-Stem-Making Machines, of which the following is a specification.

Our invention relates to a machine adapted to make a stem comprising a tube of inflammable material, such as paper, that contains a combustible, such as gunpowder, the resulting stem being more particularly adapted for use in fire-crackers, fireworks, and similar articles.

The object of our invention is to provide a machine that will be capable of forming a stem such as described continuously and in long lengths, and in carrying out our invention we provide an organization comprising a hollow tube or mandrel, about which a strip of paper is adapted to be wound, and devices for drawing the paper from said tube or mandrel as fast as it is wound thereon, whereby a tube of inflammable material is continuously produced, and means are provided for supplying the said hollow tube with the proper combustible or powder and for enabling the same to be deposited within the paper tube as it is drawn from the forming tube or mandrel.

The mechanism we have illustrated in the drawings comprises more particularly a hollow tube or mandrel, means for supplying a combustible or powder thereto, means for carrying a roll of paper or other suitable material and for winding the same around the tube or mandrel, means for drawing the paper therefrom when so wound, means for causing the powder to be deposited within the coil of paper in proper quantities, means for giving to the formed and charged tube a supplemental bodily twist to contract its diameter, and means for sizing and moving the completed and charged tube. The means we preferably use for so depositing the powder within the paper tube consists of a core of combustible material—such, for instance, as cotton thread— which passes through the tube or mandrel and into the paper and moves coincidently with it, the core or thread being drawn through the rotating forming-tube into the paper tube, so as to cause the powder to pass into said latter tube with the core or thread.

The invention also consists in the novel details of improvement and the combination of parts that will be more fully hereinafter set forth and then pointed out in the claims.

Reference is to be had to the accompanying drawings, forming part hereof, wherein—

Figure 2:
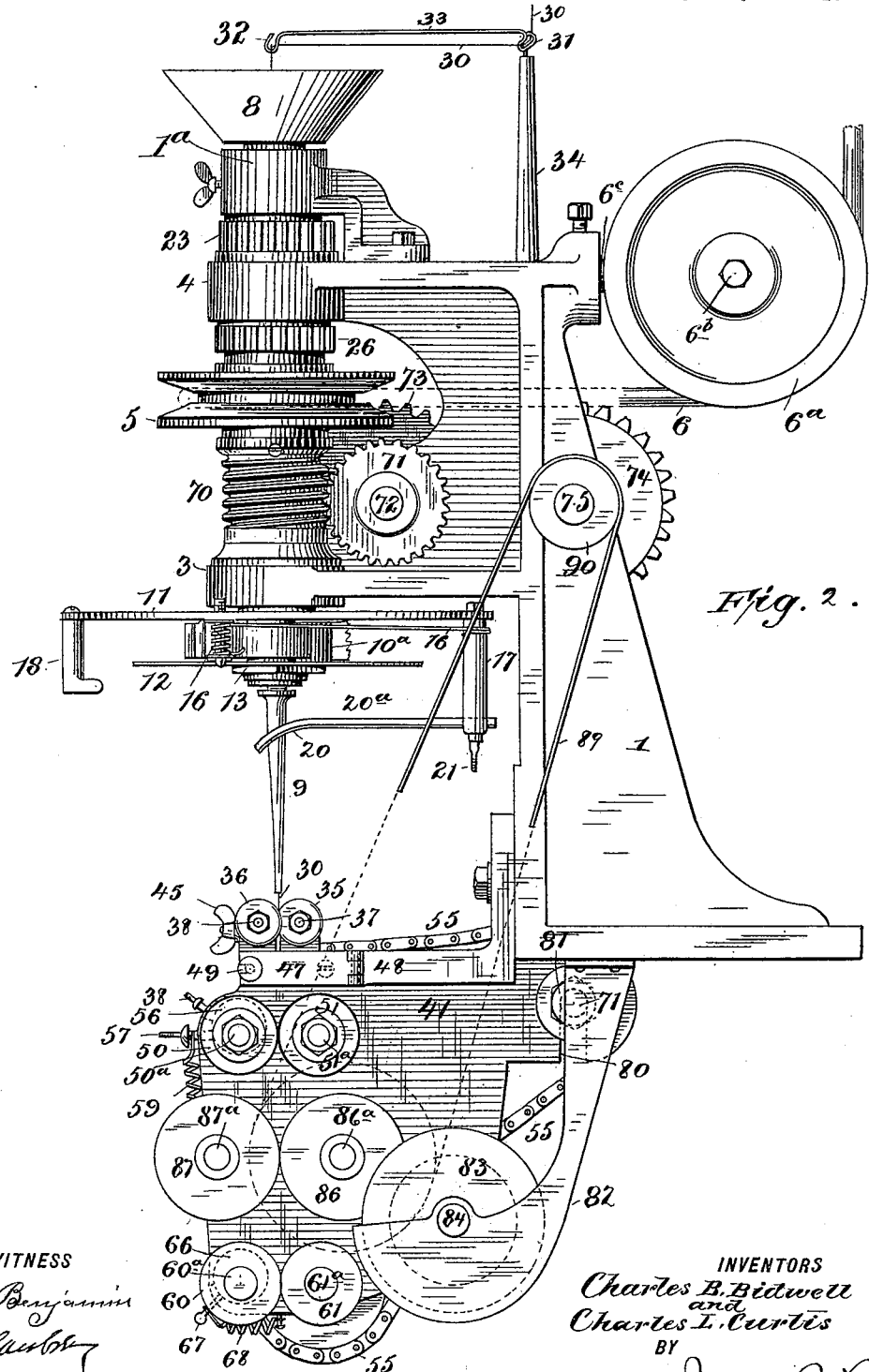
Figure 3:
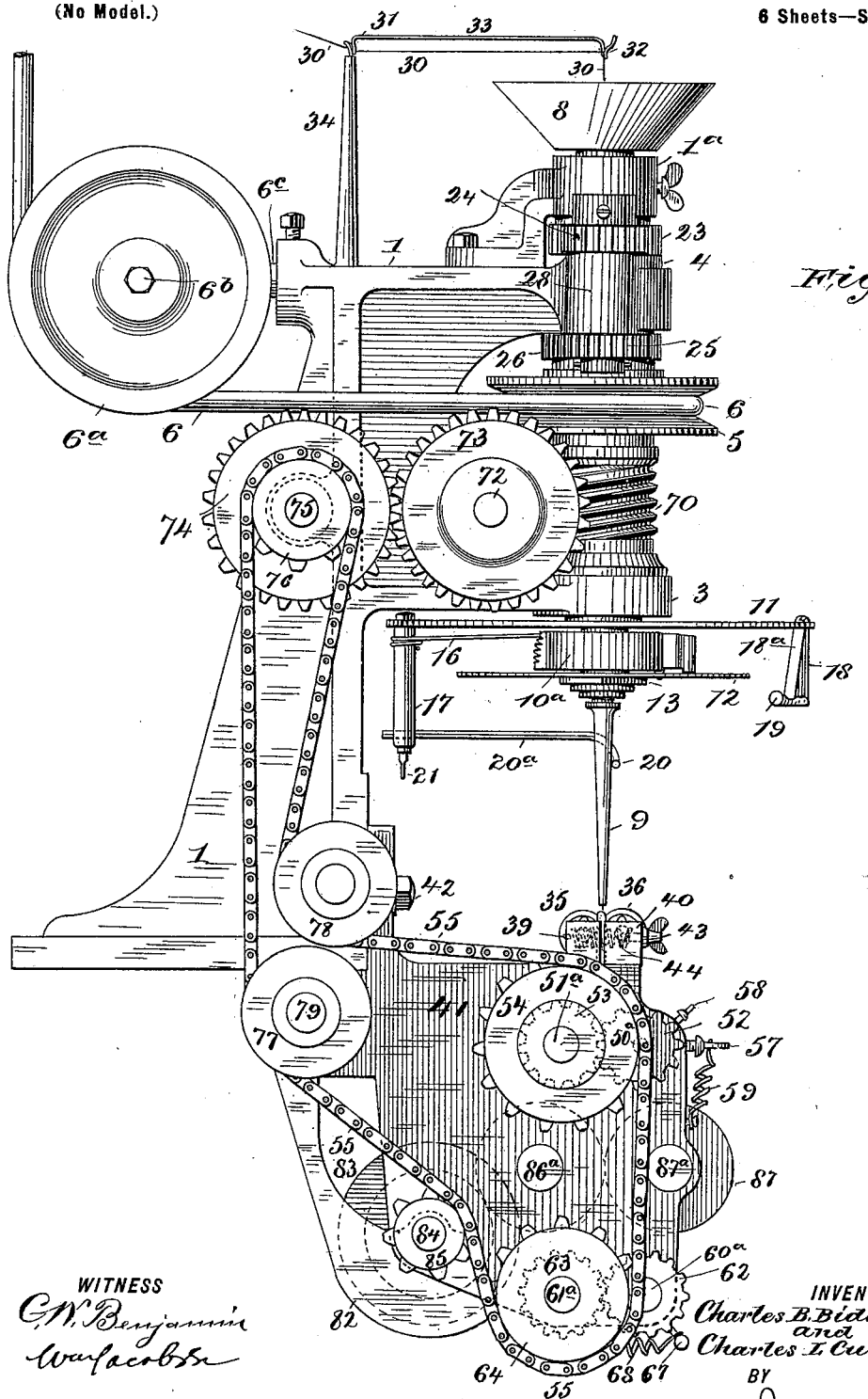

Figure 1 is a front elevation of a stem-making machine embodying our invention. Fig. 2 is a side elevation thereof looking from the right in Fig. 1. Fig. 3 is a similar view looking from the left in Fig. 1. Fig. 4 is a central vertical section through the upper portion of the machine, the parts corresponding in position to that shown in Fig. 1. Fig. 5 is a detail view of the lower portion of the machine shown in Fig. 2, illustrating the manner of sizing and feeding the paper coil for the stem; and Fig. 6 is an inverted plan view of the paper-roll carrier and winder, taken on the line $y\ y$, Fig. 5. Fig. 7 is a view, partly in section, of the pasting or gumming device especially. Fig. 8 is a plan view, partly in section, of the tension-rolls; and Figs. 9 and 10, transverse and longitudinal sections of a portion of the supporting-bracket, showing the eccentric-shaft end bearings for the drawing-rolls.

In the accompanying drawings, in which similar numerals of reference indicate corresponding parts in the several views, 1 indicates a frame, which may be of any suitable construction and adapted to sustain the operative parts of the machine, and 2, Fig. 4, is a hollow spindle journaled in suitable bearings 3 4, supported by the frame 1. The spindle 2 is shown provided with a pulley 5 to receive a belt 6 for rotating the same, $6^a$ being a guide-sheave for said belt mounted on an axle $6^b$, extending from an arm $6^c$, secured to the frame 1.

At 7 is a tube that extends from a hopper or funnel 8 and projects into the bore of spindle 2, (see Fig. 4,) this tube and hopper being adapted to deliver a combustible material, such as powder, the hopper being shown supported by a bracket 1ª on frame 1.

At 9 is a hollow inverted cone-shaped tube or mandrel, around which a strip of inflammable material—such, for instance, as paper 10—is adapted to be wound in the form of a spiral tube, (see Fig. 5,) and the bore in said tube or mandel is alined with the bore in tube 7. (See Fig. 4.)

The spindle 2 is provided with means for supporting a paper-roll 10ª and for guiding the strip of paper from said roll in its passage to the tube 9. The means we have shown for this purpose comprise a disk or extension 11, attached to the spindle 2 below the bearing 3, and the removable disk 12, attached to said spindle, but removably connected therewith, so that the paper-roll 10ª can be adjusted upon the lower end of spindle 2. For this purpose the disk 12 is provided with the bore to pass over the end of spindle 2, and said spindle is provided with screw-threads 2ª to receive corresponding threads on a nut 13. By this means new rolls of paper can be applied on spindle 2 as desired.

At 14 is a finger carried by disk 11 and adapted to bear against the paper-roll 10ª to act as a brake thereon. The finger 14 is shown provided with ears 14ª, that are journaled on a pin 15, carried by disk 11, and a spring 16 acts upon said finger and also upon a pendent post or abutment 17, carried by disk 12, to maintain a spring tension upon the paper-roll. It is evident, however, that the finger 14 could be itself in the nature of a spring, or otherwise arranged for the same purpose. The disk 11 also carries a guide and deflector 18, over which the strip of paper 10 is adapted to pass from the roll 10ª to the tube or mandrel 9. The deflector we have shown consists of a block having one edge 18ª located at an acute angle to the disk 11, and said edge is rounded, so that the paper 10ª will readily slip over it.

At 19 is a finger carried by the disk 11 and substantially parallel therewith and at a slight distance from the deflector 18, the arrangement being such that the paper strip 10 passes from the roll 10ª first over the rear and outer vertical sides 18ᵇ 18ᶜ of the deflector 18, thence over the inclined rounded edge 18ª, whereby the paper strip is turned or deflected from its horizontal plane, thence over the finger 19 and to another finger 20, that lies near the tube or mandrel 9 and at substantially right angles thereto. (See Fig. 6.) The finger 20 extends from a bar or stem 20ª, that is connected with the post 17, the post 17 for this purpose being provided with an aperture to receive said stem 20ª and with a thumb-screw 21 for holding the latter to said post. By this means the finger 20 can be adjusted toward and from the tube or mandrel 9. From the finger 20 the paper strip 10 passes to the mandrel 9, around which it is wound in the form of a spiral, and it will be understood that as the spindle 2 rotates and carries the paper-roll around with it the paper strip 10 will be wound on the tube or mandrel 9, and the spiral tube so formed will be drawn from the tube or mandrel 9, as hereinafter explained.

In order to enable the spiral tube to be readily drawn away from tube or mandrel 9 as fast as it is wound thereon, we have provided an arrangement whereby said tube or mandrel may be rotated in the same direction as the spindle 2, but at a slightly-reduced speed. The arrangement we have shown is as follows: 22 is a tube having a bore 22ª at its lower end and to which the tube or mandrel 9 is attached, being shown so attached by screw-threads that connect said parts, the bores of the tube 22 and of the tube or mandrel 9 being alined. The tube 22 is in the nature of a hollow spindle and is located within the bore of spindle 2, being shown journaled within a bearing at the lower part of the latter and being shown provided at its upper end with a boss or enlargement 22ᵇ, whereby it is journaled within the upper end of the bore in spindle 2. (See Fig. 4.) At its upper end the tube or spindle 22 carries a pinion or gear 23, that meshes with a pinion 24, that is connected with a pinion 25, which meshes with a pinion 26, secured to the spindle 2. The pinions 24 25 are shown secured upon a shaft 27, that is journaled in bearings in an extension 28, carried by frame 1, the pinions 23 24 being thus adapted to rotate in unison. The gear-train 23 24 25 26 is so arranged that through its medium spindle 2 will rotate spindle 22 at a relatively slower speed, in the arrangement shown the relation of the speed of rotation of such spindles being such that spindle 2 makes six rotations to five rotations of spindle 22. Thus it will be seen that through the medium of the gearing described the spindles 2 and 22 and the tube or mandrel 9 rotate in the same direction and in .nison, but at such relatively different speeds that sufficient time elapses to enable the paper strip 10 to be wound upon tube or mandrel 9 and in such manner that it may be drawn therefrom at a proper speed commensurate with the winding of the paper thereon in the required spiral form.

It will be understood, furthermore, that the spirally-arranged paper tube formed on the mandrel 9, as described, may be termed "endless," meaning that it is produced in long continuous lengths, such lengths being only limited by the quantity of paper on the paper-roll 10ª, and also that as the paper tube thus formed is drawn from the mandrel 9 it will be supplied or filled with a combustible—such, for instance, as gunpowder—delivered from tube or mandrel 9. Now in order to properly fill the paper tube with this powder we have provided a flexible core 30, which is in the nature of a combustible material—such, for instance, as cotton thread—which core is adapted to pass through the hopper 8, tube 7, and tube or mandrel 9, and from the open end of the latter into the paper tube, or, in other words, the paper tube is formed about the core 30. This core 30 is supplied in continuous lengths and by preference passes from a bobbin or other source of supply, (not shown,) and it is shown passing through guides or eyes 31 32, that are shown formed on a wire 33, supported by a post 34, carried by frame 1, the eye 32 being shown held above the hopper 8, so that the core or thread 30 may pass directly through said hopper and through the tubes 7, 22, and 9 and be drawn away with the paper tube, which when filled with the powder and said core forms the stem to be produced by our machine. The particular purpose of this core or thread 30 is to draw powder from the lower open end of tube or mandrel 9 and to pass it into the paper tube as the latter is formed upon said mandrel. It will be noticed in Fig. 4 that the bore in tube or mandrel 9 is tapered (but not necessarily) from its upper to its lower end, and it will be understood that as the powder fills said bore from the hopper 8 it would not properly pass therefrom into the paper tube without some assistance. Therefore as the core or thread 30 is drawn from the mandrel 9 with the paper tube it will carry with it a proper quantity of powder, and thus deposit the powder within the paper tube. The resulting product will be a combustible stem, comprising a paper tube containing powder and a combustible core. Inasmuch as the core 30 is only employed for the purpose of facilitating the passage of the powder from the mandrel 9 into paper tubes it may be substituted by other means, as a rotating or reciprocating wire, or be omitted entirely if the powder can be made to flow freely without such assistance.

We have shown means for drawing the paper tube from mandrel 9 as it is produced thereon for compressing the resulting stem and for giving a final firm twist to the same as it leaves the mandrel 9, and we have also shown means for gumming the edges or all of the paper that forms the stem. The arrangements we have shown for the purpose are as follows:

35 36 are juxtaposed friction-rolls having shoulders or flanges $35^a$, $36^a$, between which rolls and their flanges the paper tube containing the powder passes. The rolls 35 36 are mounted on spindles 37 38, that are supported in blocks 39 40, carried by a bracket 41, supported by frame 1, but said bracket could be an integral part of said frame. We have shown the bracket adjustably secured to frame 1 by means of a bolt 32, that passes through a slot 43 and enters frame 1. The rolls 35 36 are held pressed against each other by means of a spring 44 and are adjusted toward and from each other by means of a thumb-screw 45, the blocks 39 40 being separate and pivoted at their ends by pins $39^a$ $40^a$ to the top of the bracket 41. It will be understood that the rollers 35 36 exert a pressure upon the stem as it passes from the tube or mandrel 9, and also holds said stem while a final twist is given the same as the spindle 2 and mandrel 9 rotate, so as to firmly compress the paper tube upon the contained powder and its core 30. In addition to the friction-rolls 35 36 we preferably pass the completed stem through a friction-clamp located beneath said rollers and which consists of a plate 47, pivoted, as at 48, to bracket 41 and held in position and with an appropriate gripping tension against the paper tube by means of a thumb-screw 49. (See Figs. 1, 2, and 5.)

At 50 51 are friction drawing-rolls that are located beneath the rolls 35 36 and between which the stem is adapted to pass and to be drawn or fed by the rolls 50 51. The rolls 50 51 are carried by shafts $50^a$ $51^a$, journaled in bearings in bracket 41. The shafts $50^a$ $51^a$ carry pinions 52 53 that mesh. The shaft $51^a$ is shown provided at the other end with a sprocket-wheel 54, that receives a chain 55, whereby said shafts $50^a$ $51^a$ may be rotated in unison to cause the rolls 50 51 to draw or feed the stem. By preference one of the shafts, as $50^a$, is made adjustable to enable the stem to be passed between the rolls 50 51 and to also enable a spring tension to be kept upon said stem. For this purpose we have shown the shaft $50^a$ eccentrically journaled in a bearing 56 by means of the eccentric rings or collars $56^a$, Figs. 9 and 10, that are in turn journaled in the bearing in bracket 41, and from the shaft $50^a$ extends an arm 57, Fig. 1, whereby said bearing may be turned on its axis, during which movement the roll 50 will be moved toward or from the roll 51, and 58 is a thumb-screw which passes through the bracket 41 and which by contact is adapted to hold the bearing in any desired position. The arm 57 is shown acted upon by a spring 59, the spring being shown connected with said arm and with bracket 41 in such manner as to normally tend to press the rolls 50 51 together.

From the foregoing it will be understood that as shafts $50^a$ $51^a$ are rotated in the proper direction and at the proper speed the stem that is wound upon mandrel 9 will be drawn therefrom as fast as it is formed.

We have shown another set of feeding-rolls 60 61, mounted on shafts $60^a$ $61^a$, carried by bracket 41, and said shafts carry gears 62 63, that mesh, the shaft $61^a$ being provided with a sprocket-wheel 64, that receives the chain 55, whereby both sets of the rolls 50 51 and 60 61 are rotated in unison and at the same speed. The shaft $60^a$ is also eccentrically journaled in a bearing (a duplicate of 56) carried in bracket 41 and having an arm 67 connected by a spring 68 to bracket 41 similarly and for the same purpose as the corresponding parts described with reference to roll 50 and its parts.

In order that the rolls 50 51 and 60 61 may be conveniently operated with a speed commensurate with the rotation of spindle 2 and tube or mandrel 9, we have shown the chain 55 as driven from the spindle 2 as follows: Upon the spindle 2 is a worm 70, that meshes with a worm-gear 71, carried by a shaft 72, journaled in bearings in frame 1, and the shaft 72 carries a spur-wheel 73, that meshes with a spur-wheel 74, carried by a shaft 75, journaled in bearings on frame 1, and the shaft 75 carries a sprocket-wheel 76, over which the chain 55 travels. At 77 78 are idle-wheels journaled on frame 1 or bracket 41 or otherwise supported, over which the chain 55 travels, and one of these idle-wheels is made adjustable to take up the slack in said chain. We have shown the shaft 79 of wheel 78 as adjustably held in a slot 80 in bracket 41 and adapted to be secured in place by a nut 81. (See Figs. 2 and 5.)

By preference we apply a suitable gum or adhesive to the stem A as it is drawn through the machine, and for this purpose we have shown a gumming device arranged as follows: At 82 is a receptacle carried by frame 1 or bracket 41 and adapted to contain gum or other suitable adhesive, and 83 is a roll carried by a shaft 84, journaled on said receptacle, and said shaft carries a sprocket-wheel 85, adapted to be engaged by the chain 55 to rotate the roll 83. At 86 87 are distributing brushes or disks carried by shafts $86^a$ $87^a$, supported in bearings in bracket 41 and so arranged at their peripheries that the stem A will pass between them and receive gum or adhesive therefrom. The brush or disk 86 is adapted to engage the distributing roll or brush 83, and by preference the roll 86 is positively driven, and for this purpose we have shown its shaft $86^a$ provided with a pulley 88, that receives a belt 89, which passes from a pulley 90, carried by shaft 75, whereby the brush 86 will be driven at a speed commensurate with the movements of the other parts of the machine.

From the foregoing it will be understood that a stem suitable for use in fire-crackers, fireworks, and other analogous devices may be quickly and readily produced practically automatically, because when the material for the stem is once adjusted in position in the machine the machine will operate in completing the stem without further manual attention.

It will be understood that as the rollers 50 51 draw the partially-arranged paper tube from tube or mandrel 9 it will also draw the core 30, and that as the core 30 is drawn through tube or mandrel 9, and thus deposited in the paper tube, it will cause the powder from mandrel 9 to pass into said paper tube; also, that as the stem is compressed between the rolls 35 36 a final twist will be given to the stem at a point between said rolls and the delivery end of mandrel 9 by the rotation of spindle 2 to make the stem quite firm.

We do not limit our invention to the details of construction shown and described, as they may be varied without departing from the spirit of our invention.

Having now described our invention, what we claim is—

1. A stem-making machine comprising a hollow spindle, a tube or hollow spindle therein, a tube or mandrel connected with the second-mentioned spindle, a support for a paper-roll carried by the first-mentioned spindle, means for rotating said spindles, and means for guiding the paper strip in its passage to said tube or mandrel, substantially as described.

2. A stem-making machine comprising a hollow spindle, a tube or hollow spindle therein, a tube or mandrel connected with the second-mentioned spindle, a support for a paper-roll carried by the first-mentioned spindle, means for guiding the paper strip in its passage to said tube or mandrel, and means for rotating said spindles at relatively different speeds, substantially as described.

3. A stem-making machine comprising a hollow spindle, a tube or hollow spindle therein, a tube or mandrel connected with the second-mentioned spindle, a support for a paper-roll carried by the first-mentioned spindle, means for guiding the paper strip in its passage to said tube or mandrel, and means for passing a core continuously through said tube or mandrel, substantially as described.

4. A stem-making machine comprising a hollow spindle, a tube or hollow spindle therein, a tube or mandrel connected with the second-mentioned spindle, a support for a paper-roll carried by the first-mentioned spindle, means for guiding the paper strip in its passage to said tube or mandrel, means for passing a core continuously through said tube or mandrel, and means for rotating said spindles at relatively different speeds, substantially as described.

5. In a stem-making machine the combination of a hollow spindle, means for rotating the same, another spindle concentric therewith, a tube or mandrel connected with the second-mentioned spindle, gearing for driving the second-mentioned spindle by the first-mentioned spindle, a support for a paper-roll carried by the first-mentioned spindle, and means for guiding the paper strip in its passage to said tube or mandrel whereby it may be wound thereon, substantially as described.

6. The combination of a hollow spindle, means for rotating the same, another hollow spindle concentric therewith, a tube or mandrel connected with the second-mentioned spindle, a hopper communicating with the second-mentioned spindle, a support for a paper-roll connected with the first-mentioned spindle, and means for guiding the paper strip to said tube or mandrel, substantially as described.

7. The combination of a hollow spindle, means for supporting and operating the same, another hollow spindle concentric therewith, a tube or mandrel connected with the second-mentioned spindle, a hopper, a tube projecting therefrom into the second-mentioned spindle, a support for a paper-roll connected with the first-mentioned spindle, and means for guiding the paper strip to the tube or mandrel, substantially as described.

8. The combination of a hollow spindle, means for supporting and rotating the same, a gear connected therewith, another hollow spindle concentric with the first-mentioned spindle, a tube or mandrel connected therewith, a gear also connected therewith, intermediate gears connecting the first two gears whereby the second-mentioned spindle will be rotated by the first-mentioned spindle, a support for a paper-roll connected with the first-mentioned spindle, and means for guiding the paper strip in its passage to said tube or mandrel, substantially as described.

9. The combination of a hollow spindle, means for supporting and operating the same, a rotative tube or mandrel, means for supporting a paper-roll on said spindle, a deflector connected with said spindle and having an edge inclined rotatively to the axis of the spindle over which the paper strip is adapted to pass to deflect it as it travels toward the tube or mandrel, substantially as described.

10. The combination of a hollow spindle, means for supporting and operating the same, a tube or mandrel, means for connecting a paper-roll with said spindle so that its axis will be concentric with the axis of the spindle, a deflector for a paper strip having an inclined edge, and a finger over which said paper strip may pass to said tube or mandrel, substantially as described.

11. The combination of a hollow spindle, means for supporting and operating the same, means for supporting a paper-roll thereon, a disk or extension carried at the end thereof, a paper-deflector carried by said disk or extension, a brake or finger to act on the paper-roll, and a hollow tube or mandrel to receive the paper strip, substantially as described.

12. The combination of a hollow spindle, means for supporting and operating the same, means for supporting a paper-roll on said spindle, a disk or extension carried by said spindle, a paper-deflector connected therewith, an adjustable finger also connected with said disk or extension to receive the paper strip, and a tube or mandrel upon which the paper strip is to be wound, substantially as described.

13. The combination of a hollow spindle, means for supporting and operating the same, a disk or extension carried thereby, a detachable disk or extension also connected with said spindle for supporting a paper-roll, a paper-deflector, a guiding-finger for the paper strip, and a tube or mandrel to receive the paper strip, substantially as described.

14. In a stem-making machine the combination of means for forming a paper tube and for filling the same with a combustible, with a pair of feeding-rolls adapted to grasp said stem, one of said rolls being eccentrically supported, and means for operating said rolls, substantially as described.

15. In a stem-making machine the combination of means for forming a paper tube and for filling the same with a combustible, with a pair of feeding-rolls, one of said rolls being eccentrically mounted in a movable bearing, a spring adapted to hold said bearing in position to grip the stem between said rolls, and means for operating said rolls, substantially as described.

16. The combination of a spindle, a rotative tube or mandrel, means for winding a strip of paper thereon, feeding-rolls for drawing said wound strip, gears connecting said rolls, a sprocket wheel and chain for operating said gears, another sprocket-wheel for said chain, and gearing connecting said spindle with the last-mentioned sprocket-wheel to draw the tube away at a speed equal to its formation, substantially as described.

17. The combination of a spindle, a rotative tube or mandrel, means for winding a paper strip thereon, duplex pairs of feeding-rolls, gears connecting the respective pairs of rolls, a sprocket-wheel connected with one roll of each pair, a chain passing over said sprocket-wheels, another sprocket-wheel to receive said chain, and gearing connecting the last-mentioned sprocket-wheel with said spindle to draw the tube away at a speed equal to its formation, substantially as described.

18. The combination of a spindle, a rotative tube or mandrel, means for winding a paper strip upon the latter, a pair of feeding-rolls for the wound strip geared together, a sprocket-wheel connected with one of said rolls, means for holding an adhesive, a distributing-roll for said adhesive, a sprocket-wheel connected with said distributing-roll, a chain passing over said sprocket-wheels, another sprocket-wheel to receive said chain gearing connecting said spindle with the last-mentioned sprocket-wheel, and means for applying adhesive to the wound strip, substantially as described.

Signed at the city, county, and State of New York this 26th day of January, 1898.

CHARLES B. BIDWELL.
CHARLES L. CURTIS.

Witnesses:
JOSEPH L. LEVY,
WM. JACOBSEN.